Jan. 23, 1923.
J. A. RENSTROM.
CLEANING ATTACHMENT FOR FORD LUBRICATING TUBES.
FILED MAR. 6, 1922.
1,442,825
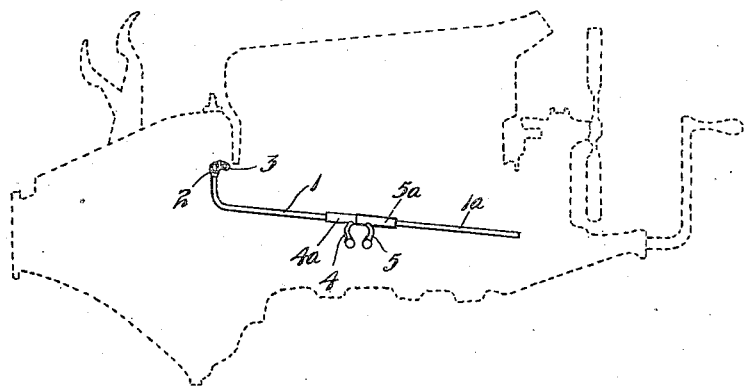
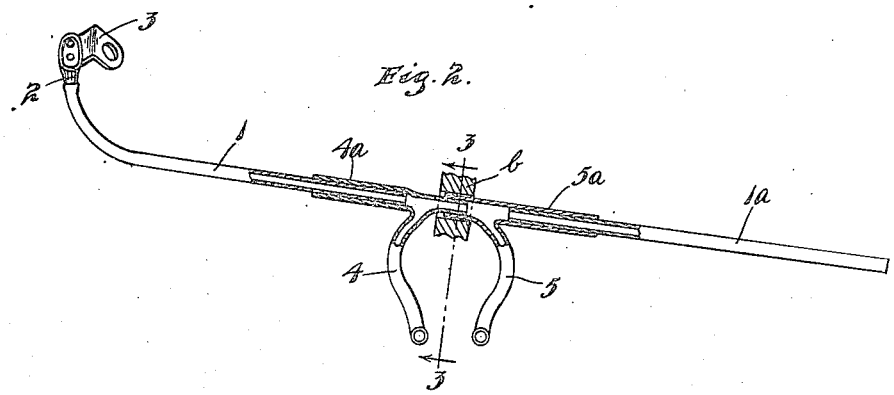
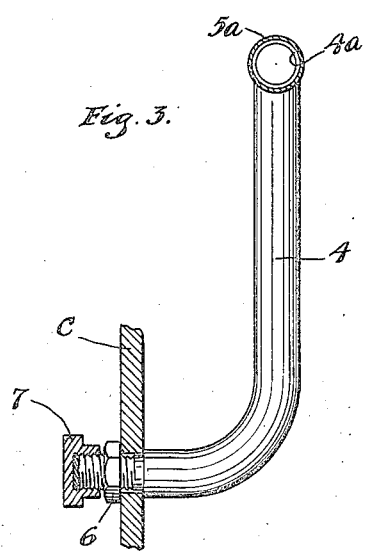
INVENTOR.
JOHN A. RENSTROM.
BY HIS ATTORNEY.
James H. Williamson Patented Jan. 23, 1923.

1,442,825

UNITED STATES PATENT OFFICE.

JOHN A. RENSTROM, OF MORA, MINNESOTA.

CLEANING ATTACHMENT FOR FORD LUBRICATING TUBES.

Application filed March 6, 1922. Serial No. 541,602.

*To all whom it may concern:*

Be it known that I, JOHN A. RENSTROM, a citizen of the United States, residing at Mora, in the county of Kanabec and State of Minnesota, have invented certain new and useful Improvements in Cleaning Attachments for Ford Lubricating Tubes; and I do hereby declare the following to be a full, clear, and exact description of the invention, such as will enable others skilled in the art to which it appertains to make and use the same.

This invention relates to a lubricating device for an automobile, and particularly an automobile of the well known Ford type. In such automobiles there is usually provided in the crank case a tube for oiling certain gears at the front thereof. This tube is provided with a flaring open and upwardly bent front end which receives the oil by centrifugal action of the revolving parts and conveys the same by gravity to the front of the casing where it is deposited upon the said gears. This tube often becomes clogged and it is a difficult task to gain access to the same for the purpose of cleaning it.

It is an object of this invention, therefore, to so construct the said tube that the same can be readily and easily cleaned without dismantling the parts of the engine or engine casing.

It is more specifically an object of the invention to provide the tube with two curved arms which extend therefrom in opposite directions and which project outside of the engine casing in convenient and accessible position where they are provided with removable closures so that a cleaning implement can be passed therein and be guided into the tube in either direction therethrough.

These and other objects and advantages of the invention will be fully set forth in the following description made in connection with the accompanying drawings in which like reference characters refer to the same parts throughout the different views and in which, Fig. 1 is a view in side elevation showing the tube and indicating certain parts of the engine and automobile by dotted lines;

Fig. 2 is a view in side elevation of the tube partly in section on an enlarged scale; and Fig. 3 is a view in sectional elevation taken on the line 3—3 of Fig. 2, also shown on an enlarged scale.

Referring to the drawings, the engine of a Ford automobile is indicated in dotted lines in Fig. 1. In such automobiles, a tube 1 is provided inside the engine casing which has a flaring and upwardly bent open front end 2 equipped with an attaching bracket or flange 3 for holding the same in proper position. The revolving crank shaft, clutches and other parts in the engine casing throw the oil contained therein upwardly so that the same is continuously thrown into and caught by the front end of the tube 1. This oil passes therethrough forwardly and downwardly by gravity where it drips from the front end of the tube onto certain gears and transmission parts which are thus continuously oiled. The tube 1 has heretofore been made of one straight piece of tubing and if the same became clogged it was necessary to dismantle part of the engine casing and the transmission parts at the front thereof to gain access to the same for the purpose of cleaning it.

In accordance with the present invention, the tube is provided with two laterally projecting arms 4 and 5, which arms project from the line of the tube 1 in opposite directions and at an acute angle. The arms 4 and 5 are, for this purpose, provided with straight portions $4^a$ and $5^a$ and the tube 1 is divided into a main portion 1 and an auxiliary portion $1^a$. The end of the portion 1 is telescoped with the portion $4^a$ of the arm 4 and the portion $1^a$ is telescoped with the portion $5^a$ of the arm 5. In the standard Ford machine, the tube 1 usually passes through a web indicated at $b$ and in order to conveniently assemble the described structure, the parts 4 and 5 are formed separate and provided with short straight telescoping portions, which portions are disposed substantially in the opening through the web $b$. The arms 4 and 5 extend downwardly and laterally and are arranged to have their ends project through spaced openings in the side of the engine casing $c$. The ends of the tubes are threaded and provided with suitable lock nuts 6 to hold them firmly in position and the outer ends of the arms are provided with closing caps 7 having suitable gasket washers therein.

With the described structure, the oil will be received in the rear end of the tube 1, as usual, and will flow downwardly through the same and after the arms 4 and 5 are filled, the oil will travel as usual to the front end of the tube and be distributed, as desired. Should the tube become clogged the caps 7 can be removed and a flexible cleaning wire or rod inserted in the openings in the arms 4 or 5. When inserted in the arms 4, the cleaning implement will pass therethrough and be directed to the front end of the tube and will clean the portion 1ª. When inserted in the arm 5, the cleaning will be directed into the rear portion 1 and will clean this part of the tube. The material of which the tube and the arms are made is quite thin and the ends thereof offer no resistance to the passage of the cleaning rod. Such a rod may be merely a flexible wire or may be a flexible spring wire surrounded by a coiled spring of much finer wire. Such a rod is well known in the art and forms a very efficient cleaning means.

From the above description it is seen that applicant has provided a very simple and efficient structure by which the oiling tube can be quickly and easily cleaned without dismantling any of the engine casing or transmission parts. The device can be inexpensively made and conveniently installed on a Ford or similar type of automobile and when once installed, the tube can be kept clean, as stated with little or no trouble.

It will, of course, be understood that various changes may be made in the form, details, arrangement and proportions of the parts without departing from the scope of applicant's invention, which, generally stated, consists in the matter shown and described and set forth in the appended claims.

What is claimed is:

1. In a lubricating structure, a tube adapted to convey oil, a branch tube leading from an intermediate point of said tube and extending therefrom in one direction at an acute angle, another tube leading from an intermediate point of the first mentioned tube and extending therefrom at an acute angle in the opposite direction, said branch tubes being extended to a point of convenient access and provided with removable closures whereby a cleaning implement can be inserted in the tubes and be directed in one direction or another in the first mentioned tube.

2. An oil distributing device for an automobile comprising a tube adapted to receive and convey oil, said tube being divided at an intermediate point, a tube telescoping with one of the divided portions and having a curved arm extending at an acute angle thereto, a tube telescoping with the other divided portion and having a curved arm extending at an acute angle thereto in the opposite direction, said last mentioned tubes having telescoping straight portions, the said arms thereof being equipped with removable closures.

3. A lubricating tube for automobiles adapted to convey oil provided with laterally projecting curved arms leading from said tube in opposite directions, said arms being provided with removable closures and adapted to receive and guide a flexible clean-out device into the respective ends of said tube.

4. The combination with the engine casing and connected parts of a Ford or similar type of automobile, of a downwardly and forwardly extending tube having an open upper end adapted to receive oil and an open front end for distributing the same, said tube being provided with curved arms extending therefrom at intermediate points at acute angles and in opposite directions, said arms being extended through and secured in the side of the engine casing, and removable closures for the open ends of said arms.

5. In a lubricating structure for an automobile, a tube adapted to convey oil and being secured in position along the engine casing, and branch tubes projecting from said tube at an intermediate point and being curved tangentially to said tube in opposite directions, said branch tubes being provided with removable closures at their ends whereby a flexible clean-out device can be inserted in said ends and will be guided into different ends, respectively, of the first mentioned tube.

In testimony whereof I affix my signature.

JOHN A. RENSTROM.